United States Patent
Pasquier et al.

(10) Patent No.: US 9,759,085 B2
(45) Date of Patent: Sep. 12, 2017

(54) DEVICE AND METHOD FOR PROTECTING AN AIRCRAFT TURBOMACHINE COMPUTER AGAINST SPEED MEASUREMENT ERRORS

(71) Applicant: MICROTURBO, Toulouse (FR)

(72) Inventors: Ludovic Pasquier, Bruguieres (FR); Remi Joachim, Dremil-Lafage (FR)

(73) Assignee: MICROTURBO, Toulouse (FR)

(*) Notice: Subject to any disclaimer, the term of this patent is extended or adjusted under 35 U.S.C. 154(b) by 0 days.

(21) Appl. No.: 14/441,668

(22) PCT Filed: Nov. 12, 2013

(86) PCT No.: PCT/FR2013/052699
§ 371 (c)(1),
(2) Date: May 8, 2015

(87) PCT Pub. No.: WO2014/076398
PCT Pub. Date: May 22, 2014

(65) Prior Publication Data
US 2015/0292348 A1    Oct. 15, 2015

(30) Foreign Application Priority Data
Nov. 13, 2012  (FR) ..................... 12 60802

(51) Int. Cl.
*G01C 23/00* (2006.01)
*G05D 1/00* (2006.01)
(Continued)

(52) U.S. Cl.
CPC ............ *F01D 17/06* (2013.01); *B64D 31/06* (2013.01); *B64D 41/00* (2013.01); *G01M 15/14* (2013.01);
(Continued)

(58) Field of Classification Search
CPC . F01D 17/06; G01P 21/02; G01P 3/00; G01P 21/00; B64D 31/06; B64D 41/00; G01M 17/00; G01M 15/14; Y02T 50/671
(Continued)

(56) References Cited

U.S. PATENT DOCUMENTS 3,859,006 A    1/1975 Randell
4,071,897 A *  1/1978 Groves, Jr. ............. F01D 21/02
                                                    290/40 A
(Continued)

OTHER PUBLICATIONS

U.S. Appl. No. 14/441,882, filed May 11, 2015, Pasquier, et al.
(Continued)

*Primary Examiner* — Jaime Figueroa
(74) *Attorney, Agent, or Firm* — Oblon, McClelland, Maier & Neustadt, L.L.P.

(57) ABSTRACT

A device protecting an aircraft turbomachine computer against speed measurement errors, including: on a speed regulation channel: a speed sensor of a turbomachine gearbox shaft, a speed measurement circuit, and a speed regulation circuit; on a monitoring channel: a speed sensor of a turbomachine gas generator shaft, a speed measurement circuit, and a turbomachine stop control circuit. Each channel uses dissimilar characteristics eliminating common mode errors. Each speed sensor delivers a pseudo-sine frequency signal. On each channel, speed monitoring circuits compare the frequency signal with a minimum threshold, delivering an error signal when the measured frequency is lower than the minimum threshold. A common speed cross checking circuit detects exceeding a determined deviation between both frequencies, the monitored deviation being higher or lower than a maximum deviation corresponding to loss of a frequency period on either sensor. Analyzing the error signals, exceeding the determined deviation can control stopping the turbomachine.

12 Claims, 2 Drawing Sheets

(51) Int. Cl.
| | |
|---|---|
| *G05D 3/00* | (2006.01) |
| *G06F 7/00* | (2006.01) |
| *G06F 1/00* | (2006.01) |
| *F01D 17/06* | (2006.01) |
| *G01P 21/02* | (2006.01) |
| *B64D 31/06* | (2006.01) |
| *B64D 41/00* | (2006.01) |
| *G01M 15/14* | (2006.01) |
| *G01M 17/00* | (2006.01) |
| *G01P 3/00* | (2006.01) |
| *G01P 21/00* | (2006.01) |

(52) U.S. Cl.
CPC .............. *G01M 17/00* (2013.01); *G01P 3/00* (2013.01); *G01P 21/00* (2013.01); *G01P 21/02* (2013.01); *Y02T 50/671* (2013.01)

(58) Field of Classification Search
USPC .......................................................... 701/3, 1
See application file for complete search history.

(56) References Cited

U.S. PATENT DOCUMENTS

| | | | |
|---|---|---|---|
| 4,166,221 A * | 8/1979 | McGaha ................. F01D 21/02 | 290/40 R |
| 4,217,617 A | 8/1980 | Rossi et al. | |
| 4,474,013 A * | 10/1984 | Chamberlain .......... F01D 21/02 | 417/17 |
| 4,569,021 A * | 2/1986 | Larson .................... G05D 1/063 | 244/182 |
| 4,667,114 A * | 5/1987 | Rossi ...................... H02H 7/093 | 290/40 A |
| 5,234,315 A | 8/1993 | Ogihara et al. | |
| 5,651,661 A * | 7/1997 | Agahi ..................... F01D 1/14 | 415/155 |
| 6,176,074 B1 | 1/2001 | Thompson et al. | |
| 6,480,780 B1 | 11/2002 | Schwamm | |
| 6,578,794 B1 * | 6/2003 | Clark ...................... G05B 9/03 | 244/194 |
| 9,002,616 B2 * | 4/2015 | Genevrier .............. F02D 45/00 | 123/353 |
| 2001/0000090 A1 | 4/2001 | Thompson et al. | |
| 2008/0213084 A1 * | 9/2008 | Rosenfield ............. F01D 21/02 | 415/30 |
| 2009/0293476 A1 * | 12/2009 | Evans .................... F02D 23/00 | 60/602 |
| 2010/0005657 A1 | 1/2010 | Van Vactor et al. | |
| 2013/0098042 A1 * | 4/2013 | Frealle ................. F01D 21/003 | 60/734 |
| 2013/0138322 A1 * | 5/2013 | Genevrier .............. F02D 45/00 | 701/100 |

OTHER PUBLICATIONS

Frederickson, et al., "Comparison of Fault Tolerant Controllers Used in Safety Applications", ISA Transactions, vol. 30, No. 4, (Jan. 1, 1991), pp. 97-106, XP 000275597.

Yeh, "Triple-Triple Redundant 777 Primary Flight Computer", IEEE Aerospace Applications Conference. Proceedings, vol. 1, (Feb. 3, 1996), Total 15 Pages, XP 000603215.

Xiaoxun, "A Comparison of SAE ARP 4754A and ARP 4754", Procedia Engineering, vol. 17, (Jan. 1, 2011), pp. 400-406, XP 055100005.

International Search Report Issued Feb. 12, 2014 in PCT/FR13/052699 Filed Nov. 12, 2013.

French Search Report Issued Aug. 28, 2013 in Application No. FR 1260802 Filed Nov. 13, 2012.

* cited by examiner

DEVICE AND METHOD FOR PROTECTING AN AIRCRAFT TURBOMACHINE COMPUTER AGAINST SPEED MEASUREMENT ERRORS

TECHNICAL FIELD

The invention relates to a device and a method for protecting a turbomachine computer, for example an Auxiliary Power Unit (APU), on board an aircraft, for example a helicopter, against speed measurement errors.

STATE OF THE PRIOR ART

The field of the invention is that of aircraft turbomachines, and more particularly that of aircraft turbomachine computers used to regulate the behavior of these turbomachines. These computers can accommodate a regulation channel and a monitoring channel or a channel protecting against speed measurement errors in a same casing, which enables a more economical cost and a lower weight than a solution in which these channels would be fitted into two separated casings.

The function of the regulation channel is to regulate the turbomachine speed. However, a failure of this regulation channel can lead to an overspeed of the turbine shaft. Indeed, when this shaft breaks, the power supplied by the gases to the turbine is no longer absorbed by the equipments driven by this shaft and the turbine rotational speed increases extremely quickly. Such an overspeed very quickly results in a breakage of the rotating parts and/or to their separation from the turbine disk. These rotating parts are then violently projected outwardly due to the centrifugal force and can pass through the case surrounding the turbine, causing very important damages in the engine, and even able to endanger the aircraft and its passengers.

The object of the monitoring channel is to prevent the consequences of such an overspeed. The monitoring channel comprises an electronic member associated with a hydromechanic member. The electronic member measures the rotational speed of the rotor. If the electronic member detects a speed measurement error, then it controls the hydromechanic member, which totally cuts off the fuel supply of the turbomachine.

In a known manner, the rotational speed of the turbine is measured with at least two independent sensors, one for the regulation channel, the other for the monitoring channel. The representative frequencies of the turbomachine gearbox and gas generator rotational speeds are the primary variables for regulating the rotational speed (regulation) and for protecting against an associated overspeed start (monitoring).

Since a safety analysis has revealed a direct link between these frequencies and an overspeed occurrence of the turbomachine, the object of the invention is to provide a device and a method for protecting the turbomachine computer against the speed measurement errors enabling the accuracy of the frequency measurements to be ensured in order in particular to avoid any underestimated speed measurement, by guaranteeing the absence of a common mode error that could lead to an unprotected overspeed. This constraint is imposed by the need to guarantee the highest safety level according to the ARP4754 FDAL A standard (catastrophic).

DISCLOSURE OF THE INVENTION

The invention relates to a device for protecting an aircraft turbomachine computer against speed measurement errors comprising:

on a speed regulation channel:
    a speed sensor of the turbomachine gearbox shaft,
    a speed measurement circuit,
    a speed regulation circuit,
on a monitoring channel:
    a speed sensor of the turbomachine gas generator shaft,
    a speed measurement circuit,
    a turbomachine stop control circuit,
characterized in that each channel uses dissimilar characteristics able to eliminate the common mode errors, in that each speed sensor delivers a pseudo-sine frequency signal and in that this device comprises, on each channel, a speed monitoring circuit which carries out a comparison of the frequency signal to a minimum threshold and which delivers an error signal when the measured frequency is lower than this minimum threshold, and a common speed cross checking circuit to detect the exceeding of a determined deviation between both frequencies such that the monitored deviation is higher than a maximum deviation or the monitored deviation is lower than a minimum deviation corresponding to the loss of a frequency period on either sensor, and means for analyzing these error signals and the exceeding of the determined deviation to control the turbomachine stop.

Advantageously, the speed sensors are wheels of different technologies and having different numbers of teeth.

Advantageously, the shafts are different shafts rotating at different rotational speeds.

Advantageously, the frequency signals are signals of different frequencies such that the loss of a period on one of the signals or even of both signals simultaneously leads to an abnormal deviation between both speeds higher than the maximum acceleration of an APU and greatly higher than a speed deviation upon a shaft maximum torsion.

Advantageously, the frequency signals are conveyed on different electrical routings.

Advantageously, the frequency signals are used by different electronic boards.

Advantageously, the device of the invention comprises a wiring break detection circuit on each channel.

Advantageously, the turbomachine can be an Auxiliary Power Unit (APU). The invention can relate to an aircraft, for example a helicopter, implementing such a device.

The invention also relates to a method for protecting an aircraft turbomachine computer against speed measurement errors, comprising a gas generator, an air compressor, a gearbox and an electrical power supply unit, this computer comprising a speed regulation channel and a monitoring channel, the speed regulation channel using the frequency of a speed sensor of the gearbox shaft, the monitoring channel using the frequency of a speed sensor of the gas generator shaft, characterized in that it comprises the following steps:
    measuring a frequency signal on each channel,
    checking the coherence of each frequency signal by comparison with a minimum threshold,
    comparing these frequency signals to each other to detect the deviation between the frequencies,
    stopping the turbomachine in case of a deviation higher than a determined value.

Advantageously, the turbomachine is stopped in case of the absence of a frequency signal, on at least one channel, during a determined time after the turbomachine start control. Advantageously, the turbomachine is stopped in case of loss of a frequency signal in operation.

Advantageously, when the minimum frequency Fmin is reached and the signals seem coherent, the following additional checks occur:

on the regulation channel side, the turbomachine is stopped in case of detection of an unlikely speed variation, the confirmed loss of one or several periods leading to this detection, the regulation channel establishing this defect and stopping the turbomachine, on the monitoring channel side, the turbomachine is stopped in case of detection of a tooth loss on the speed signal of the monitoring channel, the monitoring channel establishing this defect and stopping the turbomachine.

Advantageously, in the case where the minimum frequency Fmin is not reached, the following additional checks occur:

on the regulation channel side, the turbomachine is stopped in case of detection that the speed of the regulation channel has not exceeded an underspeed, within the allotted time, the regulation channel establishing this defect and stopping the turbomachine.

DETAILED DISCLOSURE OF PARTICULAR EMBODIMENTS

Figure 1:
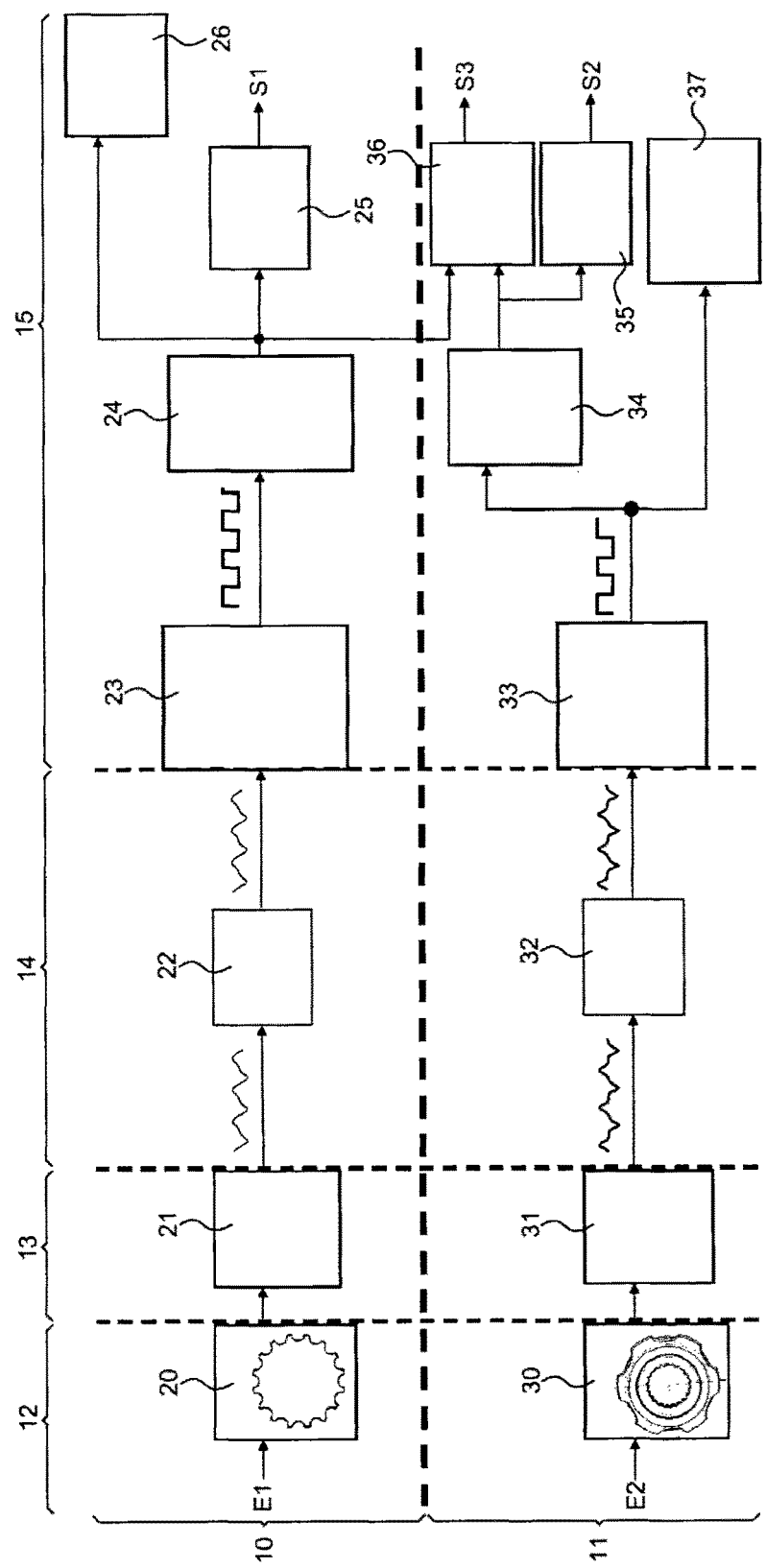
FIG. 1 illustrates the device for protecting an aircraft turbomachine computer against speed measurement errors, according to the invention.

The device for protecting an aircraft turbomachine computer against speed measurement errors according to the invention, as illustrated in FIG. 1, comprises a speed regulation channel 10 and a channel for monitoring speed measurement errors 11. At the input E1, the regulation channel 10 measures the rotational speed of the gearbox shaft using a speed sensor, for example a magnetic sensor 21 provided facing the teeth of a phonic wheel 20 fitted on this shaft.

At the input E2, the monitoring channel 11 measures the rotational speed of the turbomachine gas generator shaft using a speed sensor, for example a magnetic sensor 31 provided facing the teeth of a phonic wheel 30 fitted on this shaft. These two channels producing different frequencies, a coherence check 36 of both frequencies thus produced is carried out inside the monitoring channel 11.

FIG. 1 illustrates the different circuits of the device of the invention respectively provided in the turbomachine 12, in the sensor 13, in the wiring 14 and in the electronic control unit (ECU) 15, for both channels 10 and 11.

Figure 2:
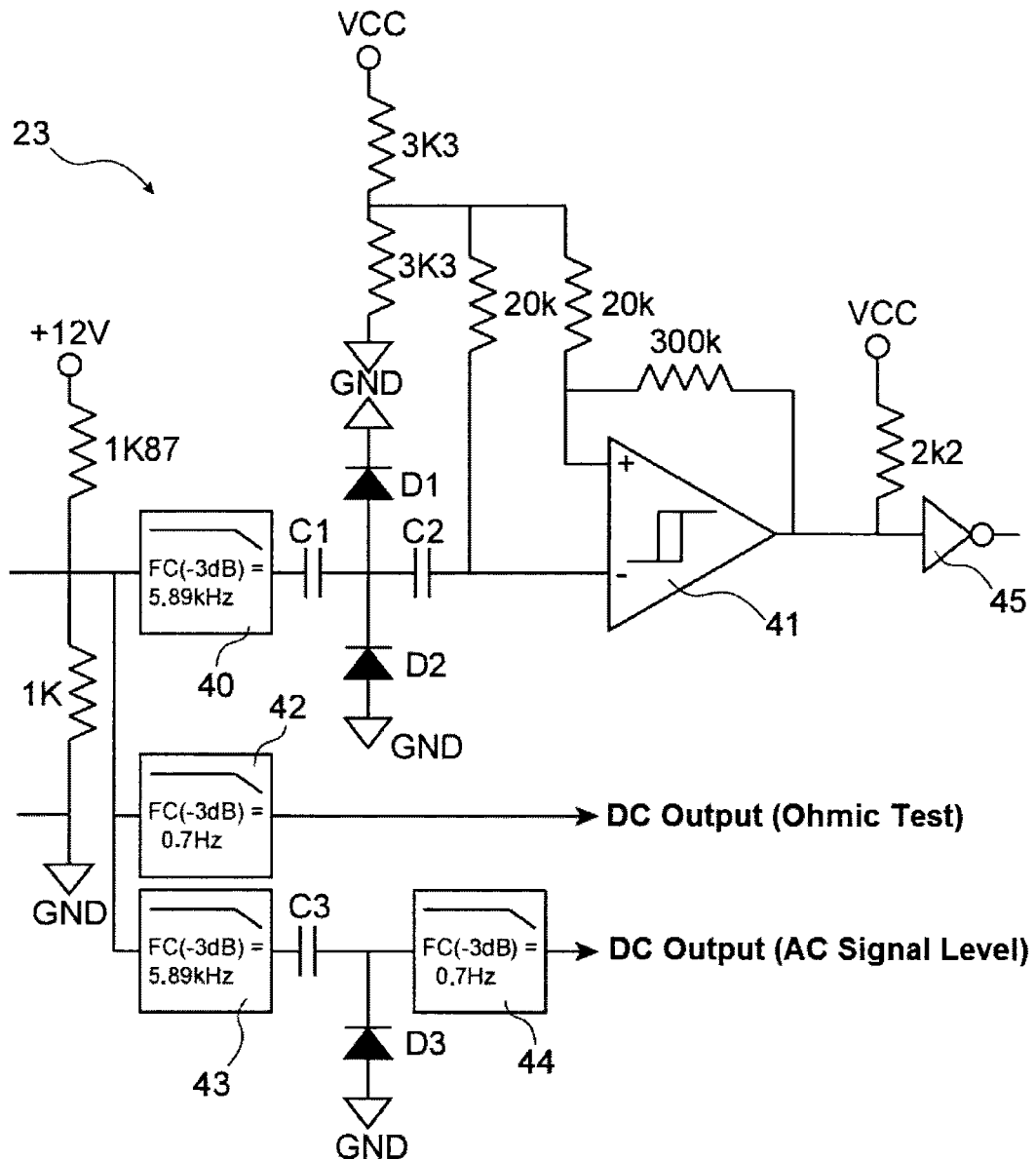
FIG. 2 illustrates an exemplary embodiment of a speed measurement circuit of the device of the invention.

In the regulation channel 10, the device of the invention comprises:

a phonic wheel 20, a speed sensor 21 of the turbomachine gearbox shaft which delivers a pseudo-sine frequency signal which can reach at most 35 volts peak-to-peak, a wiring circuit 22 which conveys this pseudo-sine signal, a circuit 23, detailed in FIG. 2, for shaping this pseudo-sine signal, which delivers a square frequency signal varying between both 0 and 5 volts levels, and detects a possible wiring break, a speed measurement circuit 24 which delivers a speed measurement in revolutions per minute, a speed monitoring circuit 25 which carries out a comparison with a minimum threshold, checks the exceeding of the underspeed within the allotted time, monitors an unlikely speed variation, and which possibly delivers a speed problem detection signal S1, a speed regulation circuit 26.

In the monitoring channel 11, the device of the invention comprises:

a phonic wheel 30 having a technology, rotational axis, rotational speed, and a number of teeth different from those of the phonic wheel 20, a speed sensor 31 of the turbomachine gas generator shaft, which delivers a pseudo-sine frequency signal, of a frequency different from that of the sensor 21, which can reach at most 35 volts peak-to-peak, a wiring circuit 32 which conveys this pseudo sine signal using a specific electrical harness with a routing different from that of the circuit 22, a circuit 33 for shaping this pseudo-sine signal, different from that of the circuit 23, which delivers a square frequency signal varying between both 0 and 5 volts levels, and detects a possible wiring break, a speed measurement circuit 34 which delivers a speed measurement in revolutions per minute which is different from that of the circuit 24, a speed monitoring circuit 35 which carries out a comparison with a minimum threshold and which possibly delivers a speed problem detection signal S2, a circuit 36 for cross checking the speeds obtained by the circuits 24 and 34, which enables an abnormal deviation between both speeds to be detected, by detecting the loss of a period on one of both signals or even of both signals simultaneously, which leads to an abnormal deviation between both speeds which is higher than the maximum acceleration of an APU and greatly higher than the speed deviation upon the shaft maximum torsion, and which delivers a signal S3 for detecting the cross checking of the speeds from both channels 10 and 11, a circuit 37 for possibly controlling the turbomachine stop in case of detection of an overspeed, or in case of detection of a tooth loss on the speed signal.

The device of the invention operates in the following way:

If both speed sensors 21 and 31 do not supply a signal:

on the regulation channel 10 side, the turbomachine is stopped by the circuit 25 in case of detection of the absence of a frequency signal during a determined time, for example 3 seconds, after the turbomachine start control or in case of a frequency signal loss in operation. If the regulation channel 10 establishes one of these defects, it stops the turbomachine;

on the monitoring channel 11 side, the turbomachine is stopped by the circuit 35, in case of detection of the absence of a frequency signal during a determined time, for example 3 seconds, after the turbomachine start control or in case of a frequency signal loss in operation. If the monitoring channel 11 establishes one of these defects, it stops the turbomachine.

In operation and beyond a minimum frequency threshold (Fmin) on either speed sensors 21 and 31, as checked in the circuits 25 and 35, the measured frequencies are compared in the circuit 36 in order to detect the exceeding of an abnormal deviation sized as follows:

the monitored deviation is higher than a mechanically established maximum deviation, the monitored deviation is lower than a deviation corresponding to the loss of a frequency period on either sensor 21 and 31.

This abnormal deviation guarantees that one of the measures is incoherent. The device of the invention then ensures the safety of the turbomachine by cutting off the fuel supply through a specific cut-off mean of the monitoring channel 11.

If the speed sensor 21 of the regulation channel 10 does not provide a frequency or provides an underestimated frequency (loss of periods on the signal) the monitoring channel 11 functions normally. When the sensor 31 reaches the minimum frequency Fmin, the monitoring channel 11 establishes an abnormal deviation and stops the turbomachine.

If the speed sensor 31 of the monitoring channel 11 does not provide a frequency or provides an underestimated frequency (loss of periods on the signal), the regulation channel 10 functions normally. When the sensor 21 reaches the minimum frequency Fmin, the monitoring channel 11 establishes an abnormal deviation and stops the turbomachine.

If both speeds sensors 21 and 31 provide an underestimated frequency (loss of periods on the frequency signals) we have the following three cases:

Case 1: the frequency Fmin is reached and the signals are perceived as incoherent. The monitoring channel 11 establishes a deviation and stops the turbomachine.

Case 2: the frequency Fmin is reached and the signals seem coherent (on certain combinations of pulse loss). In this case the following additional checks occur:
  on the regulation channel 10 side, the turbomachine is stopped in case of detection of an unlikely speed variation (based on maximum accelerations/deceleration). The confirmed loss of one or more periods leads to this detection (this includes any pulse loss configuration in operation). The regulation channel 10 establishes this defect and stops the turbomachine.
  on the monitoring channel 11 side, the turbomachine is stopped in case of detection of a tooth loss on the speed signal of the monitoring channel 11 (a defect is monitored on the periodicity of the frequency signal and an abnormally long period is detected). The monitoring channel 11 establishes this defect and stops the turbomachine.

Case 3: the frequency Fmin is not reached, in this case the following additional checks occur:
  on the regulation channel 10 side, the turbomachine is stopped in case of detection that the speed of the regulation channel 10 has not exceeded the underspeed within the allotted time (with a frequency>Fmin). The regulation channel 10 establishes this defect and stops the turbomachine.

It is noted that using only two speed sensors 21 and 31 of identical technology, but which are independent, guarantees, thanks to the invention, a speed measurement integrity level which is compatible with requirements applicable to the functions the errors of which can have catastrophic effects, in particular the common mode errors on both channels 10 and 11. Experience shows that certain malfunctions have caused the simultaneous failure of the regulation and monitoring channels. These errors referred to as "common mode" errors cancel the independence of both channels if adequate precautions are not taken.

FIG. 2 illustrates an exemplary embodiment of the signal measurement circuit 23. This circuit comprises a hysteresis operational amplifier (300 mV centered on 2.5 volts) receiving the input signal which has gone through a low-pass filter 40 the input of which is connected to a resistance bridge followed by two capacitors C1 and C2 the mid-point of which is connected to two grounded diodes D1 and D2, and the output of which is connected to a gate 45 to deliver a square signal (0-5 volts) by peak-clipping the input pseudo-sine signal. A second low-pass filter 42 delivers a DC output (ohmic test detecting a possible wiring break). A third low-pass filter 43 followed by a capacitor C3 and by a fourth low-pass filter 44 delivers a DC output (AC signal level), a diode D3 grounding the input of the fourth low-pass filter.

In an exemplary embodiment, certain circuits can be made as a software, such as circuits 24 and 25. Certain circuits can be made as dedicated circuits (FPGA), such as circuits 33, 34 and 37.

The invention claimed is:

1. A device for protecting an aircraft turbomachine computer against speed measurement errors, comprising:
  on a speed regulation channel:
    a speed sensor of the turbomachine gearbox shaft,
    a speed measurement circuit,
    a speed regulation circuit;
  on a monitoring channel:
    a speed sensor of the turbomachine gas generator shaft,
    a speed measurement circuit,
    a turbomachine stop control circuit,
  wherein:
  both speed sensors are two sensors including facing teeth of two phonic wheels of different technologies and having a different number of teeth;
  the speed regulation channel comprises a first speed monitoring circuit which carries out a comparison of a first frequency signal to a first minimum threshold and which delivers a first speed problem signal when the first frequency signal is lower than the first minimum threshold;
  the monitoring channel comprises a second speed monitoring circuit which carries out the comparison of a second frequency signal to a second minimum threshold and which delivers a second speed problem signal when the second frequency signal is lower than the second minimum threshold;
  the device further comprising:
  a circuit for cross-checking both obtained speeds, which delivers a third speed problem signal, in case of an abnormal deviation between both speeds;
  wherein the turbomachine stop control circuit controls the turbomachine to stop in case of a speed problem,
  wherein the first and second frequency signals are signals of different frequencies such that the loss of a period on one of the signals or even of both signals simultaneously leads to an abnormal deviation between both speeds which is higher than a maximum acceleration of an auxiliary power unit and greatly higher than a speed deviation upon a shaft maximum torsion.

2. The device according to claim 1, wherein the shafts are different shafts rotating at different rotational speeds.

3. The device according to claim 1, wherein the first and second frequency signals are conveyed on different electrical routings.

4. The device according to claim 1, wherein the first and second frequency signals are used by different electronic boards.

5. The device according to claim 1, further comprising a wiring break detection circuit on each channel.

6. The device according to claim 1, wherein the turbomachine is an auxiliary power unit.

7. An aircraft comprising a device according to claim 1.

8. A method for protecting an aircraft turbomachine computer against speed measurement errors, including a gas generator, an air compressor, a gearbox, and an electrical power supply unit, the computer including a speed regulation channel and a monitoring channel, the regulation channel using a frequency of a speed sensor of the gearbox shaft, the monitoring channel using a frequency of a speed sensor of the gas generator shaft, the method comprising:
- using first and second pseudo-sine frequency signals having dissimilar characteristics;
- comparing, on the speed regulation channel, the first frequency signal to a first minimum threshold and delivering a first speed problem signal when the first frequency signal is lower than the it minimum threshold;
- comparing, on the monitoring channel, the second frequency signal to a second minimum threshold and delivering a second speed problem signal when the second frequency signal is lower than the second minimum threshold;
- cross-checking both obtained speeds and delivering a third speed problem signal in case of an abnormal deviation between both speeds; and
- controlling the turbomachine to stop in case of a speed problem,
- wherein when a minimum frequency is reached and the signals seem coherent, the following additional checks occur:
- on the regulation channel side, the turbomachine is stopped in case of detection of an unlikely speed variation, a confirmed loss of one or plural periods leading to the detection, the regulation channel establishing a defect and stopping the turbomachine;
- on the monitoring channel side, the turbomachine is stopped in case of detection of a tooth loss on the speed signal of the monitoring channel, the monitoring channel establishing a defect and stopping the turbomachine.

9. The method according to claim 8, wherein the turbomachine is stopped in case of absence of a frequency signal, on at least one channel, during a determined time after the turbomachine start control.

10. The method according to claim 8, wherein the turbomachine is stopped in case of a frequency signal loss in operation.

11. The method according to claim 8, wherein, in case that a minimum frequency is not reached, the following additional checks occur:
- on the regulation channel side, the turbomachine is stopped in case of detection that the speed of the regulation channel has not exceeded an underspeed, with a frequency higher than the minimum frequency, within an allotted time, the regulation channel establishing a defect and stopping the turbomachine.

12. A method for protecting an aircraft turbomachine computer against speed measurement errors, including a gas generator, an air compressor, a gearbox, and an electrical power supply unit, the computer including a speed regulation channel and a monitoring channel, the regulation channel using a frequency of a speed sensor of the gearbox shaft, the monitoring channel using a frequency of a speed sensor of the gas generator shaft, the method comprising:
- using first and second pseudo-sine frequency signals having dissimilar characteristics;
- comparing, on the speed regulation channel, the first frequency signal to a first minimum threshold and delivering a first speed problem signal when the first frequency signal is lower than the first minimum threshold;
- comparing, on the monitoring channel, the second frequency signal to a second minimum threshold and delivering a second speed problem signal when the second frequency signal is lower than the second minimum threshold;
- cross-checking both obtained speeds and delivering a third speed problem signal in case of an abnormal deviation between both speeds;
- wherein, in case that a minimum frequency is not reached, the following additional checks occur:
- on the regulation channel side, the turbomachine is stopped in case of detection that the speed of the regulation channel has not exceeded an underspeed, with a frequency higher than the minimum frequency, within an allotted time, the regulation channel establishing a defect and stopping the turbomachine.

\* \* \* \* \*